March 29, 1966 K. V. HACKMAN 3,243,239
RUBBER-SUPPORTED ENGINE MOUNT BEARING
Filed Aug. 24, 1962
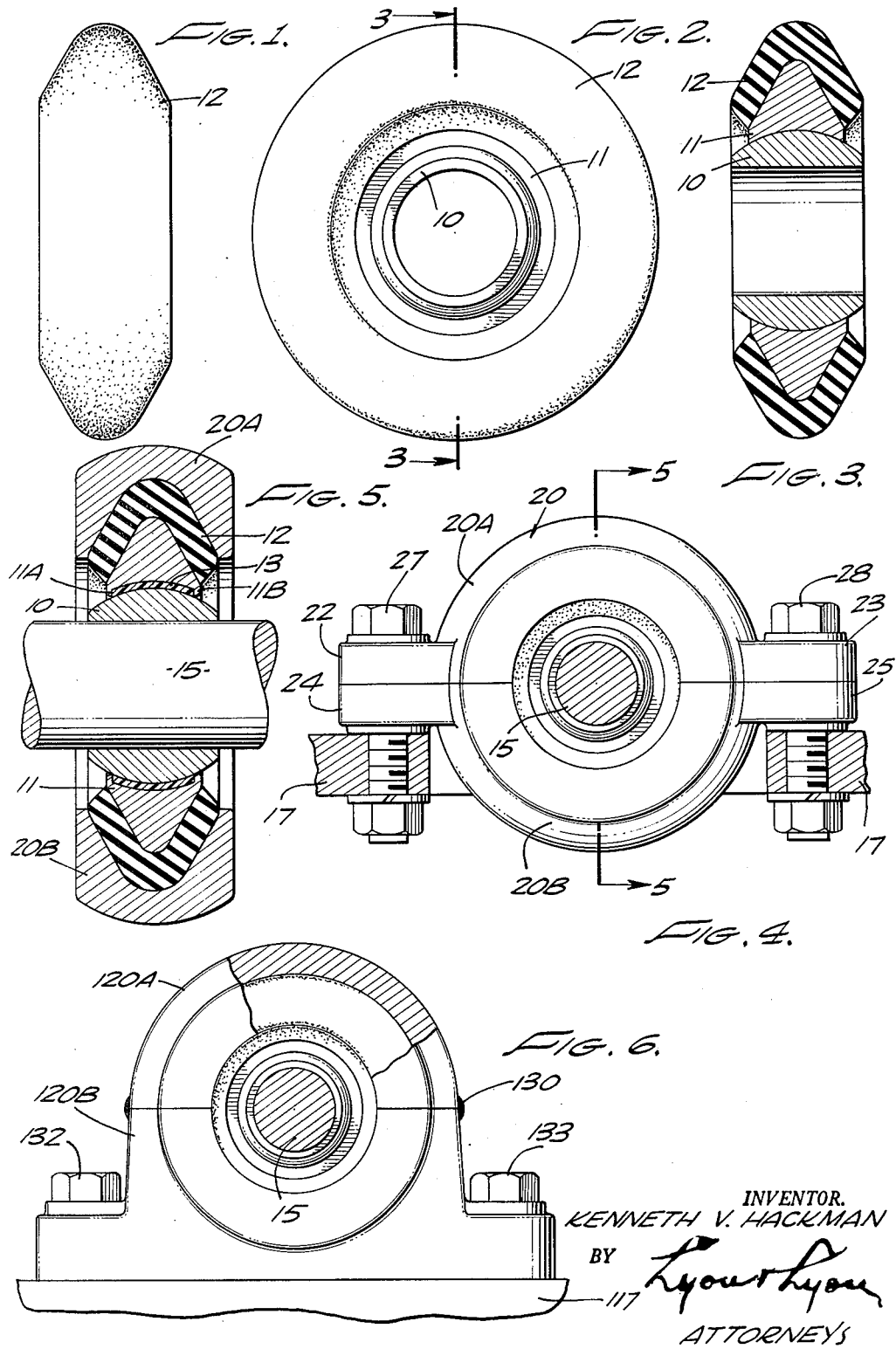
INVENTOR.
KENNETH V. HACKMAN
BY
Lyon+Lyon
ATTORNEYS United States Patent Office 3,243,239
Patented Mar. 29, 1966

3,243,239
RUBBER-SUPPORTED ENGINE MOUNT
BEARING
Kenneth V. Hackman, Arcadia, Calif., assignor to Southwest Products Co., Monrovia, Calif., a corporation of California
Filed Aug. 24, 1962, Ser. No. 219,190
6 Claims. (Cl. 308—26)

The present invention relates to means and techniques useful in producing a bearing which is particularly useful in supporting engines on aircraft.

It is desirable, in mounting engines on aircraft, to provide a bearing structure which not only is capable of being self-aligning but also is capable of resiliently mounting the engine on the aircraft frame. These two features are incorporated in the bearing structure shown herein and involve generally an apertured shaft-receiving ball retained in an outer race member of generally triangular cross section, with the outer surface of the race member having vulcanized thereto a resilient, generally V-shaped rubber ring which is readily adapted to be maintained in clamped position by a pair of split clamp members secured to the frame of the aircraft.

It is therefore a general object of the present invention to provide a bearing structure serving generally the purposes indicated above for accomplishing the above-indicated results.

Another object of the present invention is to provide a bearing structure which is particularly useful in mounting engines on aircraft.

Another object of the present invention is to provide a bearing structure which is relatively simple, compact and capable of producing not only a self-aligning function but also functions to provide a resilient mounting.

Another object of the present invention is to provide a self-aligning bearing comprising essentially an outer race and a ball retained within the race, with the outer race being specially shaped to retain a resilient elastic shock-absorbing ring which is also specially shaped to achieve a rugged and simple shock-absorbing mounting.

Another object of the present invention is to provide a self-aligning bearing having shock-absorbing features.

Another object of the present invention is to provide a self-aligning bearing constructed with an outer resilient shock-absorbing ring of material which may be readily clamped to a support, with such material serving to dampen vibrations and to absorb shock loads.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a view in front elevation of a bearing embodying features of the present invention;

FIGURE 2 is a view in side elevation of the same;

FIGURE 3 is a view taken on the line 3—3 of FIGURE 2;

FIGURE 4 illustrates a complete bearing structure which incorporates a modified bearing shown in FIGURE 5;

FIGURE 5 is a sectional view taken on the line 5—5 of FIGURE 4 and illustrates a modified bearing; and FIGURE 6 illustrates a modified form of composite bearing structure.

Referring to the drawings, and particularly to FIGURES 1-3, the bearing shown therein involves essentially three elements, namely an apertured ball 10, a race member 11 which rotatably retains the ball 10, and elastic material 12 in the form of a tire or ring vulcanized to the outer surface of the race member 11.

The ball 10 and race member 11 are preferably assembled to provide a self-aligning bearing structure in accordance with the teachings of Potter Patents 2,626,841 and 2,724,172 but in this instance the outer race member 11, instead of having a generally rectangular cross section as shown in those two patents, for the present purposes is provided with a generally triangular cross section as illustrated in FIGURE 3. The elastic tire or rim 12 is of conforming shape and is generally V-shaped, as illustrated in FIGURE 3, and the elastic material comprising the rim 12 is preferably of chloroprene rubber of 60-Shore hardness molded or vulcanized to the race member 11.

In some forms of the invention, as illustrated in FIGURE 5, the ball 10 and race member 11 may be assembled with an annular insert 13 between the race 11 and ball 10 and retained by lands 11A and 11B on the race member in accordance with the means and techniques described in the copending patent application of Jack R. Evans, Serial No. 845,730 filed October 12, 1959 now U.S. Patent 3,085,312 issued April 16, 1963 and assigned to the same assignee as the present application. In such case, the insert 13 is of the material described in the above-mentioned U.S. patent for achieving anti-friction qualities.

It will be thus understood that the present invention is applicable not only to the self-aligning bearing structure of FIGURE 3 wherein there is no insert between the race member 11 and the ball 10, but is also applicable to the arrangement in FIGURE 5 wherein the insert 13 is retained between the ball and race member.

FIGURES 4 and 6 show composite bearing structures wherein the assembly of FIGURES 3 or 5 is mounted on a support such as, for example, the frame of an aircraft, with a shaft 15 extending through the apertured ball for supporting an engine on the frame.

Referring to FIGURE 4, the frame is illustrated at 17 and a split bearing housing 20, comprising complementary housing sections 20A and 20B, embraces the rubber rim or tire 12 and clamps the same. For this purpose, the sections 20A and 20B are each provided with apertured ears 22, 23 and 24, 25, respectively, through which mounting bolts 27 and 28 extend for mounting the complete assembly on the frame member 17. Using this construction, the rubber-rimmed self-aligning bearing is releasably secured to the frame between the pair of releasably connected bearing-retaining members 20A and 20B.

In the modification shown in FIGURE 6, the bearing-retaining members 120A and 120B, serving the same purpose as the bearing-retaining members 20A and 20B of FIGURE 4, are welded together as indicated at 130, and the lower bearing-retaining member 120B is bolted by means of bolts 132 and 133 to the frame member 117.

The particular geometry of the race member 11 and the rubber-rimmed tire 12 is of importance for the transmission of both longitudinally and radially directed loads that may occur between the engine-mounting shaft 15 and the frame 17 in FIGURE 4 or the frame 117 in FIGURE 6. The rubber-rimmed tire 12 not only serves to absorb shock forces but also achieves vibration damping and serves also to increase the life of the bearing surfaces between the race and the ball, all without substantially increasing the overall size of the composite bearing mounting.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A combined self-aligning and shock-absorbing bearing comprising an apertured ball, a single piece race member having an inner annular spherical surface conforming generally with the outer surface of the ball and retaining said ball, and elastic material on the outer surface of the race member, said race member being annular and having a generally triangular cross-section, said elastic material being a ring which is generally V shaped in cross-section and is vulcanized to said race member.

2. A bearing structure as set forth in claim 3 in which an insert of antifriction material is interposed between said ball and said race member.

3. A combined self-aligning and shock-absorbing bearing comprising a ball, a single piece race having an inner annular spherical surface retaining said ball, said race having a generally triangular cross section with an outer centrally located apex portion, and a ring of elastic material on and conforming with the outer apex portion of the race member.

4. A composite self-aligning and shock-absorbing bearing structure comprising a ball, a race having an inner annular spherical surface retaining said ball, said race being generally of triangular cross section, a ring of elastic material of generally V-shaped cross section on and conforming with the outer surface of the race, and a plurality of split bearing-retaining members each having an inner surface conforming with and partially surrounding and clamping said elastic material.

5. An arrangement as set forth in claim 4 in which said split bearing-retaining members are releasably secured together.

6. An arrangement as set forth in claim 4 in which said split bearing-retaining members are permanently secured together.

References Cited by the Examiner

UNITED STATES PATENTS

| | | | |
|---|---|---|---|
| 2,662,557 | 12/1953 | Heim | 308—72 X |
| 2,733,108 | 1/1956 | Cowles | 308—184 |
| 2,932,081 | 4/1960 | Witte | 308—72 |
| 3,034,838 | 5/1962 | Abel | 308—26 |

FOREIGN PATENTS

| | | |
|---|---|---|
| 655,735 | 8/1951 | Great Britain. |
| 813,237 | 5/1959 | Great Britain. |

DAVID J. WILLIAMOWSKY, *Primary Examiner.*

ROBERT C. RIORDON, *Examiner.*

FRANK SUSKO, H. S. KIESER, *Assistant Examiners.*